United States Patent
Cornia et al.

(10) Patent No.: US 9,969,903 B2
(45) Date of Patent: May 15, 2018

(54) METHOD OF APPLYING AN ORGANOSILANE SOLUTION TO RIGID SUBSTRATES AND GROUT

(71) Applicants: Silver Cornia, Casinalbo (IT); Curt V. Rapp, Atlanta, GA (US)

(72) Inventors: Silver Cornia, Casinalbo (IT); Curt V. Rapp, Atlanta, GA (US)

( * ) Notice: Subject to any disclaimer, the term of this patent is extended or adjusted under 35 U.S.C. 154(b) by 419 days.

(21) Appl. No.: 14/606,544

(22) Filed: Jan. 27, 2015

(65) Prior Publication Data

US 2015/0210889 A1   Jul. 30, 2015

Related U.S. Application Data

(60) Provisional application No. 61/932,657, filed on Jan. 28, 2014.

(51) Int. Cl.

| C04B 41/00 | (2006.01) |
| C04B 41/84 | (2006.01) |
| C09D 183/08 | (2006.01) |
| B05D 1/02 | (2006.01) |
| B05D 1/00 | (2006.01) |
| B05D 5/00 | (2006.01) |
| B05D 1/18 | (2006.01) |
| C04B 41/49 | (2006.01) |

(52) U.S. Cl.
CPC .......... C09D 183/08 (2013.01); B05D 1/185 (2013.01); B05D 5/00 (2013.01); C04B 41/00 (2013.01); C04B 41/009 (2013.01); C04B 41/4927 (2013.01); C04B 41/84 (2013.01); *Y10T 428/23986* (2015.04); *Y10T 428/31612* (2015.04); *Y10T 428/31663* (2015.04)

(58) Field of Classification Search
None
See application file for complete search history.

(56) References Cited

U.S. PATENT DOCUMENTS

| 4,845,256 | A | * | 7/1989 | Mebes | C07F 7/1892 556/413 |
| 5,954,869 | A | * | 9/1999 | Elfersy | C07F 7/1836 106/14.11 |
| 6,113,815 | A | * | 9/2000 | Elfersy | A01N 55/00 252/588 |
| 6,178,922 | B1 | * | 1/2001 | Denesuk | A01K 1/0152 119/710 |
| 8,956,665 | B2 | * | 2/2015 | Bolkan | A01N 55/00 424/717 |
| 8,968,771 | B2 | * | 3/2015 | Richardson | A01N 25/34 424/409 |
| 2003/0073600 | A1 | * | 4/2003 | Avery | C11D 3/2006 510/382 |
| 2003/0129419 | A1 | * | 7/2003 | Chen | C03C 17/30 428/447 |
| 2010/0028462 | A1 | * | 2/2010 | Bolkan | A01N 55/00 424/717 |
| 2010/0115706 | A1 | * | 5/2010 | Bender | D06M 13/513 119/710 |
| 2013/0167754 | A1 | * | 7/2013 | Wassmer | C07F 7/0854 106/287.11 |

* cited by examiner

*Primary Examiner* — Peter A Salamon
(74) *Attorney, Agent, or Firm* — Vincent Re PLLC

(57) ABSTRACT

A stain-treated substrate comprising an extremely thin coating for stain protection. The stain-treated substrate includes substrate material and the extremely thin coating include a molecular layer of organosilane 3-(trimethoxysilyl) propyldimethyl octadecyl ammonium chloride covalently bonded to the surface of the substrate material. The substrate material can include a wide variety of materials including tile, ceramic, glass, stone and marble and can optionally be used in conjunction with a grout mixture including a diluted organosilane mixture.

8 Claims, 4 Drawing Sheets

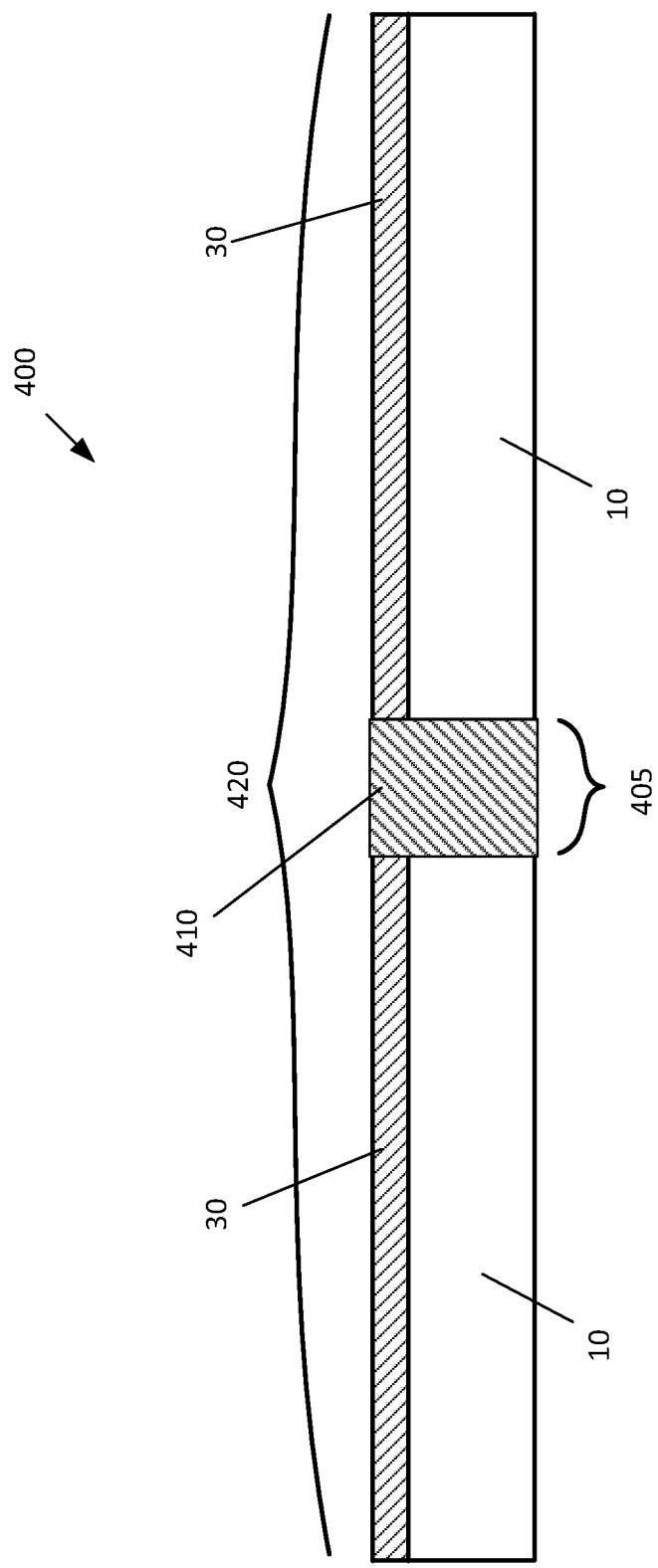

METHOD OF APPLYING AN ORGANOSILANE SOLUTION TO RIGID SUBSTRATES AND GROUT

CROSS REFERENCE TO RELATED APPLICATIONS

This disclosure claims the benefit of U.S. Provisional Application No. 61/932,657 filed on Jan. 28, 2014 which is hereby incorporated by reference.

TECHNICAL FIELD

This disclosure is related to use of an organosilane solution to coat rigid substrates. In particular, this disclosure is related to application of the solution to materials such exemplary tile products, resulting in an extremely thin layer of the compound treating the surface of the tiles, for example, through an atomized spray application.

BACKGROUND

The statements in this section merely provide background information related to the present disclosure. Accordingly, such statements are not intended to constitute an admission of prior art.

The organosilane 3-(trimethoxysilyl) propyldimethyl octadecyl ammonium chloride (organosilane), also known through the designation by a particular manufacturer as AEM 5772, was developed by Dow Corning and patented in the United States in 1973. This organosilane exhibits antimicrobial properties, and has been used as a safe and effective antimicrobial for many years. Known uses of the compound include use and application from a 72% concentrate composition and use from an alcohol based concentrate at 60% composition.

Imitators of this organosilane lack the durability of AEM 5772; most imitators lack the ability to form strong covalent bond or crosslinks, and can be easily removed with everyday household chemicals. Others are manufactured in a process that renders them less stable in water or plagues them with a reduced shelf life and a tendency to discolor surfaces or demonstrate other properties.

SUMMARY

A stain-treated substrate is disclosed comprising an extremely thin coating for stain protection. The stain-treated substrate includes substrate material and the extremely thin coating include a molecular layer of organosilane 3-(trimethoxysilyl) propyldimethyl octadecyl ammonium chloride covalently bonded to the surface of the substrate material. The substrate material can include a wide variety of materials including tile, ceramic, glass, stone and marble and can optionally be used in conjunction with a grout mixture including a diluted organosilane mixture.

BRIEF DESCRIPTION OF THE DRAWINGS

One or more embodiments will now be described, by way of example, with reference to the accompanying drawings, in which:

FIG. 3A illustrates a tile including a coating layer and excess material deposited by the application process;

FIG. 3B illustrates a wiper device sweeping across the surface of the treated tile, removing the excess material and leaving the coating in place; and FIG. 3C illustrates a finished tile including the coating intact and the excess material wiped away;

FIG. 5 illustrates an exemplary tile system including tiles treated with the disclosed coating and grout joining the two tiles with the disclosed grout/solution composition, in accordance with the present disclosure.

DETAILED DESCRIPTION

Figure 1:
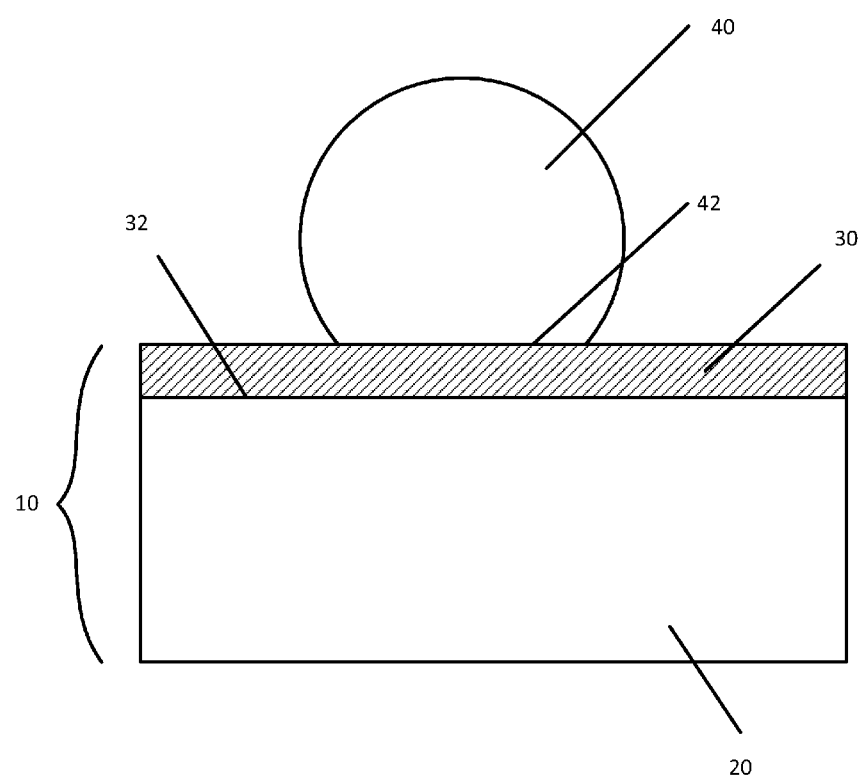
FIG. 1 illustrates an exemplary treated tile including a covalently bonded coating of the disclosed material and a contaminant including bonds to the coating, in accordance with the present disclosure.

The organosilane 3-(trimethoxysilyl) propyldimethyl octadecyl ammonium chloride has the capacity to bond to many surfaces, including ceramic, glass, stone and marble. The organosilane is capable of forming strong covalent bonds with many surfaces, and is capable of polymerization.

The disclosed organosilane solution diluted in water can be used through a range of concentration values. A solution of 1.44% concentration has been shown to exhibit favorable properties. A solution as dilute as 0.72% concentration can be used to economically create the desired coating. Although concentrations lower than 0.72% could potentially be used and similarly create the coating upon a substrate, the quantity of the solution that must be used at such concentrations to treat a surface becomes prohibitive. A solution as concentrated as 3.6% can be used to coat a surface, although at concentrations greater than 3.6%, the solution becomes excessively thick and atomization according to a disclosed spray application method becomes difficult to achieve. At concentrations over 5%, excessive bonding of the molecules of the solution to each other make the solution too thick to be practically applied to surfaces. Throughout the disclosure, the disclosed organosilane solution is intended to include any concentration within the disclosed advantageous range. Any example provided herein of application to a substrate can include use of a solution at the 1.44% concentration.

Polymerization or creation of a crosslinked organosilane network occurs through hydrolysis followed by condensation. When the organosilane is diluted in water, it reacts to form a highly reactive intermediate. After contact with a substrate, an extended micropolymer network is formed as neighboring molecules from Methoxyl bonds, or react with other available reaction sites on the substrate. The initial association to the substrate occurs due to the Methoxyl group in solution that attempts to bond with anything present. This reaction is driven by drying, and completion time of the reaction is dependent upon the temperature at which the reaction occurs. As a limiting property, the organosilane begins to decompose at 257 degrees C.

The organosilane exhibits known antimicrobial properties. Microbes are single-celled organisms that cannot be seen by the naked eye and can cause disease and other issues for humans and other organisms. An antimicrobial is a substance which is capable of destroying or inhibiting the growth of microorganisms such as bacteria, algae and fungi. To kill microbes, conventional antimicrobials frequently target the cytoplasmic membrane, DNA and protein synthesis, protein folding and cell wall synthesis. Exemplary conventional antimicrobials kill microbes by poising the microbes with a released or leaching substance. The initial contact between the antimicrobial and the target organism can be electrostatic, as most bacterial surfaces are anionic. The disclosed coating initially attracts the microbes by electrostatic attraction, and the attracted microbes are unable to grow on the surface as it is inhospitable to the organisms. A side effect of the treated surface is that it is hydrophobic.

In addition, conventional antimicrobials migrate away from the site of their application or leach into surrounding substances. The antimicrobial organosilane is a unconventional antimicrobial, as it binds directly to surfaces and does not leach or migrate.

The antimicrobial organosilane consists of three functional portions: a trimethoxysilyl group, an ammonium group and a long hydrocarbon chain. The trimethoxysilyl group covalently bonds to surfaces. The nitrogen of the ammonium group retains a positive charge. The long hydrocarbon chain specifically destroys microbes, as discussed below.

Antimicrobial activity is based on the physical attraction of the microbe's negatively charged cell to the positively charged nitrogen of the antimicrobial organosilane, which itself is covalently bound to a substrate surface by its trimethoxysilyl group. The microbe is electrostatically attracted to the polymeric network of crosslinked antimicrobial organosilane. The enzymatic skin of the microbe becomes unstable once electro statically attracted as the long hydrocarbon chain of the coating material leaves no room for the microbe to find food and grow. The long hydrocarbon chain exhibits an ideal size to hinder the growth as no food can pass between the hydrocarbon chain and the microbe itself.

One effect of the polymerization of this antimicrobial organosilane is the hydrophobicity it imparts when applied to rigid substrates. This hydrophobicity leads to stain resistance and other beneficial properties. The same electrostatic attraction occurs between the organosilane and particles of reactive materials, such as dirt. The organosilane layer acts a barrier, preventing the reactive materials from adhering to the underlying material, such as tile, and quickly releases the reactive materials when the material is washed. In this way, the layer of covalently bonded organosilane acts as a durable or permanent stain protection layer to the underlying material.

A diluted solution of the antimicrobial organosilane can be applied to various rigid substrates such as tiles to impart stain resistance, abrasion resistance, soil release and water resistance, among other beneficial properties. Although tiles are illustrated in the disclosure as a typical substrate, other typical substrate candidates intended to be included in the disclosure include: building materials, sanitary ware (such as porcelain, fiberglass, an exemplary composite material, for example including a fiber/resin composition known in the art, etc.), cultured marble, bath and shower tubs, ceramic and porcelain tile, marble, granite, slate, natural stones, vinyl, bricks, wood, engineered stones, carpet and rugs, and many other materials.

The antimicrobial organosilane solution must be applied to a substrate that is clean and free of easily removable materials. Any particulate material that comes into contact with the disclosed antimicrobial organosilane solution will inhibit reaction with the substrate because the antimicrobial organosilane will permanently bind to those materials rather than with the surface to be treated. Nonionic detergents are recommended to thoroughly clean the substrate to be treated with the antimicrobial organosilane solution. Use of any detergent requires thorough rinsing. Anionic detergents have an affinity for the antimicrobial organosilane and could interfere with proper application of the antimicrobial organosilane solution.

The coating resulting from the application of the organosilane solution will react with any available reaction materials, including oils, waxes, dirt, and other materials on the substrate, forming bonds between the molecules of the solution and the reaction material molecules. Conventional solutions known in the art bond with reaction materials, and the cleansing of these contaminants during subsequent use and washing will be accompanied by loss of the molecules of the conventional solution that are bound or otherwise associated with the contaminants. This loss of antimicrobial molecules for a conventionally treated surface can significantly reduce the effectiveness for stain protection of the treatment layer and decrease a level of activity against microorganisms of the conventional solutions. However, the disclosed antimicrobial organosilane solution disclosed herein forms strong covalent bonds with the surface of the substrate. As a result, washing of reaction materials from the disclosed antimicrobial organosilane solution breaks the weak bonds between the solution molecules and the reaction materials and does not break the stronger covalent bonds between the solution and the substrate. As a result, the disclosed antimicrobial organosilane solution can be reused for long periods without losing the easy to clean properties of the disclosed solution application.

According to one exemplary process, substrates can be treated with the disclosed antimicrobial organosilane by spray application. After the substrate is spray covered with a known quantity of disclosed antimicrobial organosilane solution, the substrate is dried. The final step is washing with water or brushing the surface of the treated substrate, if necessary, to remove surface haze and restore the surface of the finished product. In other exemplary processes, the substrates can be treated in a soaking bath, waterfall, dipping, and other similar treatment processes known in the industry, although to date a spray method as disclosed herein proves to be the most cost effective.

In an exemplary process to apply the protective polymerized layer to a surface of an exemplary batch of tiles, the batch of tiles enter a kiln on a conveyor belt. A number of different kiln configurations and types are known in the art, and the disclosed processes are not intended to be limited to any particular configuration or type. Tiles move from the entrance of the kiln to the exit, and the tiles are progressively cooked over about 30 to 60 minutes or more as the temperature changes within the kiln. Exemplary temperatures within a tile kiln can range from 1180 degrees C. to 1200 degrees C. to 1230 degrees C., depending upon the particular tile being produced. The disclosed antimicrobial organosilane solution is applied by spraying onto warm tiles as they exit the kiln. A high substrate temperature allows for faster polymerization and stronger bonding to the surface than at ambient temperature, and the ability to partially adjust the temperature of the surface to be treated up to 120 degrees C. will reduce polymerization time. It is not recommended to allow the temperature of the substrate to rise above 120 degrees C. or to dip below 15 degrees C.

If the surface to be treated is at a temperature of 120 degrees C., the polymerization is complete in about 15 minutes. If the surface to be treated is at a temperature of 100 degrees C., the polymerization is complete in about 30 minutes. If the surface to be treated is at a temperature of 50 degrees C., the polymerization is complete in about two hours. If the surface to be treated is at a temperature of 20 degrees C., the polymerization is complete in eight hours. If the surface to be treated is at a temperature of 15 degrees C., it may take up to seven days for polymerization to be complete.

The temperature of the disclosed antimicrobial organosilane solution during spray application must also be controlled. Temperatures above 160 degrees C. (320 degrees F.) over an extended period of time could result in thermal degradation of the disclosed antimicrobial organosilane solution, thus rendering treatment ineffective. Furthermore, such temperatures may lead to decomposition of the antimicrobial organosilane.

Evaporation of the water contained in the disclosed solution will change the concentration of the antimicrobial organosilane in the solution. Lower temperatures, e.g. temperatures below 25 degrees C., will cause precipitation of some of the antimicrobial organosilane out of solution. The temperature of the disclosed antimicrobial organosilane solution during spray application must be maintained above 25 degrees C. and below 50 degrees C. Optimum temperature is approximately 25-30 degrees C. (76-86 degrees F.). It will be appreciated that solutions of varying percentages of organosilane can be utilized in accordance with the disclosure, but testing has shown that disclosed solution performs as an optimal mix for the application of a protective layer to an underlying material.

The amount of disclosed antimicrobial organosilane solution to be used in spray application must also be considered. Substrates should be sprayed with about 1.5-2.5 grams disclosed antimicrobial organosilane solution per square foot (16 to 27 grams per square meter) of treated surface. An amount of 1.0 gram per square foot (11 grams per square meter) also has been shown to be efficacious but has reduced durability. The penetration of the disclosed antimicrobial organosilane solution into the surface of the substrate may vary depending on the porosity, temperature and moisture of the substrate. An amount of 3.0 grams or more solution per square foot (33 grams per square meter) may be required in such cases of increased porosity.

The spray application must be uniform across the entire surface of the substrate. The disclosed antimicrobial organosilane solution should be well atomized for spray application. A very fine drip size of less than 40-50 microns, and optimally around 20 microns, will ensure complete coverage of the substrate's surface.

Drying of the disclosed antimicrobial organosilane solution onto the substrate must be completed before the treated substrate reaches the next step of the manufacturing process. Drying can be performed in the usual manner with no special or additional equipment, but a dryer may be required to assure completeness of evaporation and polymerization.

Water is formed as silanol groups condense to stable siloxane bonds. Removal of water (evaporation) will drive the polymerization reactions to completion and produce a fully bonded, water-insoluble, nonvolatile polymer. Maximum curing occurs at 120 degrees C. (248 degrees F.) at the polymer surface. If this temperature is not attainable due to low substrate temperature or drying capacity restrictions, the substrate must be dried at least to complete liquid evaporation.

Force drying is helpful when substrate surface temperature is low or when further processing of the treated substrate is required in less than 8 hours. The best dryers are those with top-down forced-air convection, which forces air into the substrate and ensures uniformity by driving the disclosed antimicrobial organosilane solution down into the substrate.

In addition, flash drying conditions using short exposures to very high temperatures also allow for effective polymerization. Extended drying time at excessive temperatures (250 degrees C. and above) could result in thermal degradation of the antimicrobial organosilane, thus rendering the treatment ineffective. Temperatures above 220 degrees C. should be avoided.

Testing has shown that exemplary tile treated with the disclosed antimicrobial organosilane solution does not substantially affect the coefficient of friction of any tile to which it is applied, and it retains its slip resistance.

FIG. 1 illustrates an exemplary treated tile including a covalently bonded coating of the disclosed material and a contaminant including exemplary ionic bonds to the coating. Throughout the figures, the coating and the bonding layers are illustrated as perceptible layers a sizeable fraction of the thickness of the tile itself. The disclosed coating and the bonding disclosed herein are extremely small, being related to molecule thick layers and atomic bonds. It will be appreciated that the illustrated layers exaggerated for purposes of disclosing the presence of the layer and are not indicative of the scale of the coatings in relation to the size of the tile or substrate. Treated tile 10 is illustrated including organosilane coating 30, including a layer of organosilane molecules attached to each other with covalent bonds and attached with covalent bonds 32 to the surface of tile 20. Contaminant particle 40 is illustrated attached to tile 10. Particle 40 may include ionic bonds 42 attaching the particle to coating 30. As is known in the art, a typical covalent bond is stronger than a typical ionic bond. Normal cleaning processes and chemicals can clean away particle 40, thereby breaking bonds 42, while leaving coating 30 intact.

Figure 2:
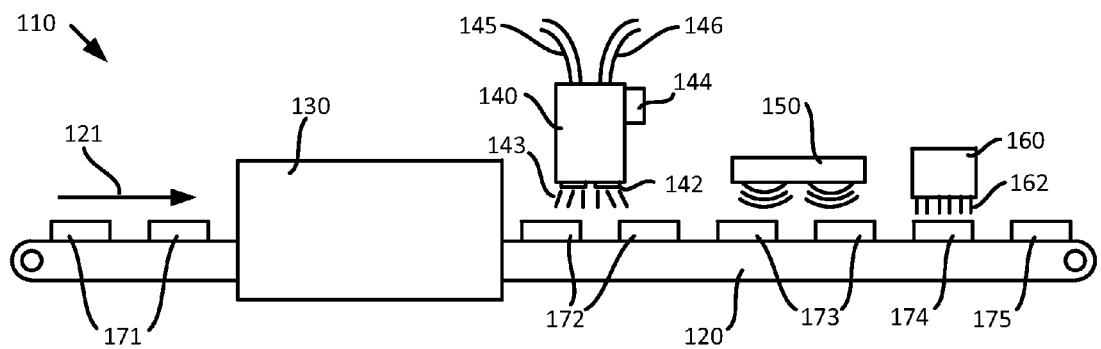
FIG. 2 illustrates an exemplary process to apply the disclosed solution as disclosed herein to a flow of tiles, in accordance with the present disclosure.

FIG. 2 illustrates an exemplary process to apply an exemplary disclosed solution as disclosed herein to a flow of tiles. Configuration 110 includes conveyor 120 moving a flow of tiles or slabs through stations of an automated process. Arrow 121 is illustrated showing a direction of travel for the tiles through the process. The solution disclosed herein can be applied to a pre-manufactured tile, for example, removed from shipping material from an original, remote manufacturing site. In one exemplary process, pre-manufactured tiles can be re-heated to a desired temperature, the disclosed solution can be sprayed upon the tiles, and then the sprayed tiles can be allowed to cure/polymerize prior to repackaging the treated tiles. As throughout the disclosure, temperature control is important to controlling the desired properties in the coating and the resulting strength of the covalent bonds in the coating. In the present example, tiles are illustrated beginning as uncooked tiles 171 entering kiln 130. Cooked tiles 172 exit kiln 130 and are treated at station 140 by disclosed organosilane solution spray 143 emanating from nozzles 142. Temperature control module 144 is an optional part of the process which can control the temperature of the organosilane mixture that is created from water supply 145 and organosilane supply 146, such that the mixture applied to the tiles has the desired temperature properties as disclosed herein. According to other embodiments, temperature control for the process is primary accomplished by controlling a temperature of the tiles as they exit the kiln. Sprayed tiles 173 are treated at station 150 with devices such as heat lamps to maintain an elevated temperature to aid in the evaporation and polymerization process disclosed herein. At station 160, polymerized tiles 174 are mechanically brushed with brushing device 162 to remove any waxy buildup remaining upon the tiles from the spraying process. Brushing device 162 can include a device with cloth, bristles, or other similar brushing mechanism known in the art. Finished tiles 175 exist conveyor 120 ready for packing and shipment. Configuration 110 and the illustrated process are provided as non-limiting exemplary embodiments of the disclosure.

Figure 3A:
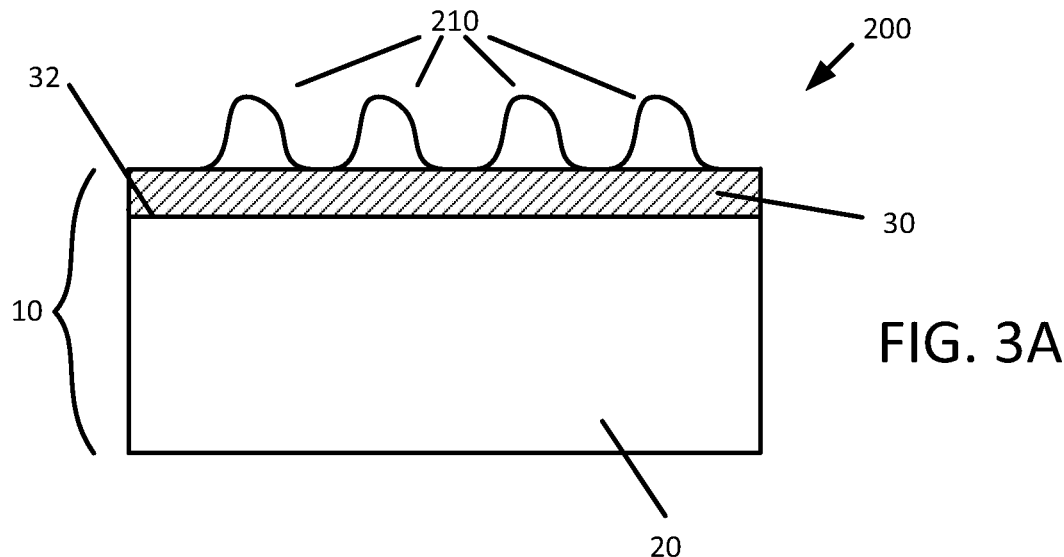
FIGS. 3A-3C illustrate exemplary formation of the coating layer and an exemplary process for removing excess material from the coating layer, in accordance with the present disclosure.
Figure 3B:
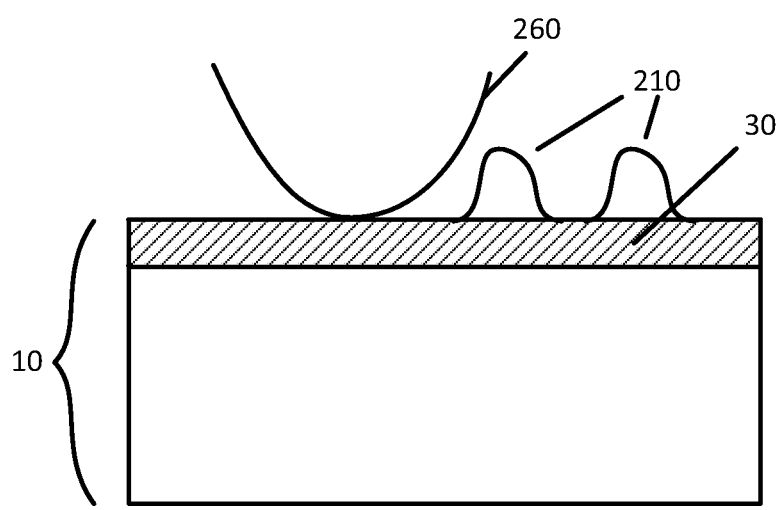
Figure 3C:
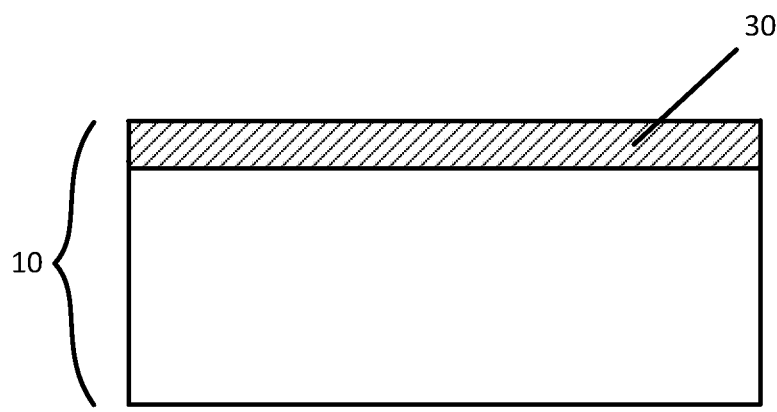

FIGS. 3A-3C illustrate exemplary formation of the coating layer and an exemplary process for removing excess material from the coating layer. FIG. 3A illustrates a tile including a coating layer and excess material deposited by the application process. Tile 200 includes treated tile 10 including tile 20, coating 30, and covalent bonds 32. The treated tile 200 additionally includes waxy excess material 210. As the disclosed solution is sprayed upon tiles, a molecular layer bonds into coating 30. However, material that is deposited upon top of the coating 30 does not covalently bond to the tile and instead leaves waxy excess material 210, which can be easily wiped away. FIG. 3B illustrates a wiper device sweeping across the surface of the treated tile, removing the excess material and leaving the coating in place. Tile 10 including coating 30 is illustrated including wiper device 260 moving from left to right across the tile removing excess material 210 from coating 30. While a mechanical wiper device 260 is illustrated, washing with a liquid, spraying with high velocity water, or any other typical cleaning method known in the art can be used to remove excess material 210 from tile 10. FIG. 3C illustrates a finished tile including the coating intact and the excess material wiped away. Tile 10 is illustrated with all of the excess material wiped away and coating 30 remaining intact.

Tiles, marble blocks, and other materials that can be used to create a surface can be treated by the disclosed solution disclosed herein. Such materials are typically held in place and sealed together by a cement mixture. A number of different types of cement mixtures can be utilized. An organosilane mixture can be used with cement mixtures to create antimicrobial and stain protection properties in the cement mixture. Grout is an exemplary cement mixture that can be used as a construction material that is used to seal joints, such as those between tiles. Grout is generally prepared by mixing a dry powder grout mixture with water. It is applied as a thick emulsion and hardens over time.

A range of concentrations of organosilane mixtures can be used to create the disclosed grout mixture. Above 5%, the grout/organosilane mixture becomes hard to mix. Below 0.1%, the mixture becomes ineffective. An organosilane mixture of 3.6% concentration has been shown to exhibit favorable properties. Where the 3.6% mixture is provided in the disclosure in an exemplary mixture, any mixture concentration in the disclosed range can be used instead.

When the water in the grout mixture is replaced with the exemplary 3.6% dilution of antimicrobial organosilane solution, the grout becomes both antimicrobial and hydrophobic, leading to the occurrence of resistance to damage caused by microorganisms, stains and abrasions, among other beneficial properties, similar to the tile treatment disclosed herein. Grout mixed with the 3.6% antimicrobial organosilane solution retains its original spread properties and such grout does not require the addition of further materials. It will be appreciated that solutions of varying percentages of organosilane can be utilized in accordance with the disclosure, but testing has shown that 3.6% solution performs as an optimal mix to create stain protection properties in the grout.

Figure 4:
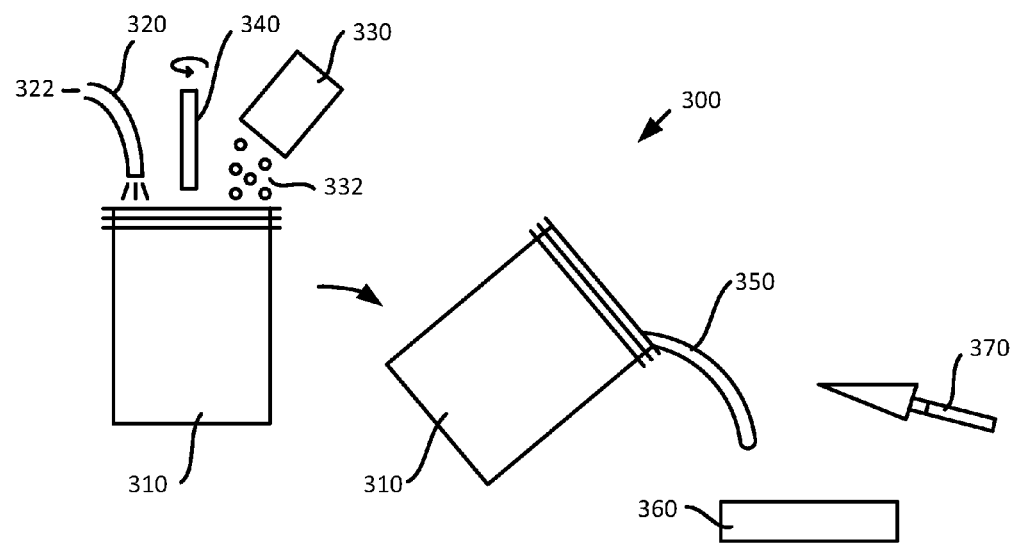
FIG. 4 illustrates mixing of an exemplary cement mixture with an organosilane solution for application to a construction surface, in accordance with the present disclosure.

FIG. 4 illustrates mixing of an exemplary cement mixture with an organosilane solution for application to a construction surface. Configuration 300 includes bucket 310 and application container 360. A flow 322 of 3.6% organosilane solution is provided through pouring device 320. Flow 322 can be temperature controlled according to the disclosure to provide desired properties in the solution at the time of mixing. Cement powder 332 is provided by cement container 330. A mixing device 340 is applied to a resulting cement mixture in bucket 310. Once the mixture is adequately mixed, bucket 310 can be tipped to provide cement mixture 350 to application container 360, such that cement mixture including the organosilane solution can be applied to construction surfaces, for example, by application with exemplary trowel tool 370. Configuration 300 and the illustrated process are provided as non-limiting exemplary embodiments of the disclosure.

The above solution including 3.6% organosilane solution is provided as an exemplary cement/grout mixture that includes stain protection and anti-microbial properties based solely upon the presence of the 3.6% organosilane solution. However, similar properties can be achieved by adding a lower percentage organosilane solution and by adding other chemicals or compounds to augment the properties of the organosilane as disclosed herein. In one non-limiting example, a cement mixture can be created including an exemplary grout powder, an organosilane solution of less than 3.6% organosilane composition, the solution being effective as an anti-microbial agent, and a latex compound, the latex compound being effective to provide stain resistance/stain protection. Other compounds including stain protection properties can be substituted for the latex in accordance with the disclosure.

FIG. 5 illustrates an exemplary tile system including tiles treated with the disclosed coating and grout joining the two tiles with the disclosed grout/solution composition, in accordance with the present disclosure. Tile system 400 is illustrated including two treated tiles 10, each including organosilane coating 30, and grout 410 with the disclosed composition filled into gap 405 between tiles 10. Coatings 30 and grout 410 combine to provide treated surface 420 which acts to provide an easily cleaned surface according to the disclosure.

Other benefits of a crosslinked organofunctional silane include: slime control, abrasion resistance, bonding enhancement, flame retardation, static retardation, soil release, UV protection, water resistance and scratch resistance.

The disclosed organosilane solution should be pH controlled, as the pH will affect the shelf life of the solution, the stability of the solution, and the reaction strength or resulting covalent bond strength in the resulting coating.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a substrate and a coating for stain protection, the apparatus comprising:
   the substrate; and
   the coating comprising a molecular layer of organosilane 3-(trimethoxysilyl) propyldimethyl octadecyl ammonium chloride wherein the coating is covalently bonded to the substrate, wherein the coating is created by:

preparing a diluted solution of organosilane 3-(trimethoxysilyl) propyldimethyl octadecyl ammonium chloride in a concentration range of between 0.72% and 3.6%;

heating and maintaining the substrate to an above-room temperature comprising a temperature of between 100 degrees Celsius and 120 degrees Celsius;

applying the water-diluted solution to the substrate;

curing the substrate and water-diluted solution until dry and polymerized at the above-room temperature; and removing excess polymerized solution from the substrate.

2. The apparatus of claim 1, wherein the substrate comprises one of porcelain, fiberglass, a composite material, cultured marble, a bath tub, a shower tub, a ceramic tile, a porcelain tile, marble, granite, slate, natural stone, vinyl, brick, wood, engineered stone, carpet, and a rug.

3. The apparatus of claim 1, wherein preparing the diluted solution comprises preparing the water-diluted solution at a concentration of 1.44%.

4. The apparatus of claim 1, wherein applying the diluted solution to the substrate comprises spraying the solution upon the substrate as an atomized mist.

5. The apparatus of claim 4, wherein the atomized mist comprises an ideal drip size of less than 50 microns.

6. The apparatus of claim 4, wherein the atomized mist comprises an ideal drip size of 20 microns.

7. The apparatus of claim 1, wherein preparing the water-diluted solution comprises maintain a temperature of the water-diluted solution between 25 degrees Celsius and 50 degrees Celsius.

8. The apparatus of claim 1, wherein preparing the water-diluted solution comprises maintain an ideal temperature of the water-diluted solution between 25 degrees Celsius and 30 degrees Celsius.

* * * * *